(12) United States Patent
Razumov

(10) Patent No.: US 7,024,378 B2
(45) Date of Patent: Apr. 4, 2006

(54) RETAIL SYSTEM WITH DRIVE-THROUGH CHECK-OUT ARRANGEMENT

(76) Inventor: Sergey N. Razumov, Electricheskiy Pereulok, dom 8, korpus 4 kvartira 7, Moscow (RU)

( * ) Notice: Subject to any disclaimer, the term of this patent is extended or adjusted under 35 U.S.C. 154(b) by 728 days.

(21) Appl. No.: 09/840,070

(22) Filed: Apr. 24, 2001

(65) Prior Publication Data

US 2002/0016747 A1 Feb. 7, 2002

Related U.S. Application Data

(60) Provisional application No. 60/233,664, filed on Sep. 19, 2000, provisional application No. 60/222,292, filed on Aug. 1, 2000.

(51) Int. Cl.
*G06F 17/60* (2006.01)

(52) U.S. Cl. .............................. 705/26; 705/7; 705/22; 186/53; 186/55

(58) Field of Classification Search ................... 705/26, 705/27, 7, 22; 186/53, 55
See application file for complete search history.

(56) References Cited

U.S. PATENT DOCUMENTS

| | | | | |
|---|---|---|---|---|
| 2,638,636 A | * | 5/1953 | Pool .............................. | 52/33 |
| 5,158,155 A | * | 10/1992 | Domain et al. ................ | 186/53 |
| 5,708,425 A | * | 1/1998 | Dwyer et al. ................. | 340/928 |
| 5,890,136 A | * | 3/1999 | Kipp ............................ | 705/22 |
| 5,969,968 A | * | 10/1999 | Pentel ......................... | 705/26 |
| 6,048,272 A | * | 4/2000 | Tsujita ......................... | 473/70 |
| 6,336,100 B1 | * | 1/2002 | Yamada ....................... | 705/26 |
| 6,386,323 B1 | * | 5/2002 | Ramachandran et al. ..... | 186/36 |
| 6,519,571 B1 | * | 2/2003 | Guheen et al. ............... | 705/14 |
| 6,574,603 B1 | * | 6/2003 | Dickson et al. ................ | 705/1 |
| 6,587,835 B1 | * | 7/2003 | Treyz et al. ................... | 705/14 |

FOREIGN PATENT DOCUMENTS

EP 1017614 * 5/2001

* cited by examiner

*Primary Examiner*—Mark Fadok
(74) *Attorney, Agent, or Firm*—McDermott Will & Emery LLP

(57) ABSTRACT

A novel retail system is provided with an advance ordering system that enables a customer to order a purchase in advance. At least one storage facility is arranged for storing goods available for ordering. Multiple retail facilities remote with respect to the storage facility enable a customer to obtain the ordered purchase after a time period sufficient to deliver the ordered purchase from the storage facility to a retail facility selected by the customer. At least one of the retail facilities has a drive-through check-out arrangement that enables a customer sitting in a vehicle to pick up the ordered purchase without leaving the vehicle.

12 Claims, 2 Drawing Sheets

RETAIL SYSTEM WITH DRIVE-THROUGH CHECK-OUT ARRANGEMENT

The present application claims priority of U.S. provisional application No. 60/222,292 filed on Aug. 1, 2000 and entitled "RETAIL SYSTEM USING INTERNET PRODUCT ORDERING", and U.S. provisional application No. 60/233,664 filed on Sep. 19, 2000 and entitled "SHOPPING FACILITY FOR INTERNET-BASED RETAIL SYSTEM", both applications being incorporated herewith by reference.

FIELD OF THE INVENTION

The present invention relates to retail systems, and more specifically, to retail systems having drive-through check-out facilities.

BACKGROUND OF THE INVENTION

Many fast food restaurants have drive-through windows that allow a customer to be served without leaving a car. For example, U.S. Pat. No. 4,901,482 discloses a multi-building shopping establishment for purchasing goods from various vendors from a vehicle. The establishment includes a plot of land, and a central complex having a plurality of discrete buildings for both the ordering and receiving ready-to-eat food products. An order for the food products is placed at the building adjacent to the building at which the food products are received.

The establishment further includes an ordering lane connecting the building at which the order is placed with the building at which the food products are received. A stack lane is provided between the ordering lane and a throughway for accepting additional vehicles prior to the placing the order for the food products.

The central complex comprised of multiple buildings groups various fast food outlets within a single area. As a result, customers sitting at their cars are enabled to simultaneously buy ready-to-eat food products from different vendors. A customer's automobile enters the shopping establishment and searches for the vendor from which the motorist wishes to make a purchase. Upon locating that vendor identified by signs, the automobile waits at a stack lane of the vendor and then enters the ordering lane to place an order at an ordering window. Thereafter, the automobile proceeds to the pick-up window to pick up a purchase from that vendor. After picking up goods from one vendor, the automobile proceeds to another building to place an order and pick up goods from another vendor.

However, such a fast-food arrangement requires a customer to wait in line every time the customer orders and picks up goods from a particular vendor. Therefore, the throughput of such a fast-food establishment is not sufficient to avoid long lines during rush hours.

In addition, the disclosed establishment can offer only limited number of fast-food items, and therefore, is not appropriate for retail stores having a large number of sales items, such as a grocery retail store.

Thus, there exists a need for a drive-through arrangement with a throughput sufficiently high to enable customers to avoid waiting in lines even during rush hours.

Also, it would be desirable to create a drive-through arrangement that can be used in a retail system offering a large number of sales items.

SUMMARY OF THE INVENTION

The present application provides a novel retail system with a drive-through arrangement that addresses problems of the prior art systems. The retail system of the present invention comprises an advance ordering system for enabling a customer to order a purchase in advance, at least one storage facility for storing goods available for ordering, and multiple purchase obtaining facilities remote with respect to the storage facility, for enabling the customer to obtain the ordered purchase delivered from the storage facility after receiving an order for the purchase from the customer. The purchase obtaining facilities include at least one drive-through purchase obtaining facility for enabling the customer in a vehicle to pick up the ordered purchase without leaving the vehicle.

In accordance with one aspect of the invention, the drive-through purchase obtaining facility for picking up a purchase may be remote with respect to a location for placing an order for that purchase.

In accordance with an embodiment of the present invention, the drive-through purchase obtaining facility may comprise multiple pick-up stations, each of which may be arranged for enabling a customer in a vehicle to pick up the ordered purchase without leaving the vehicle. For example, a pick-up station may be a parking space at a parking facility.

A control station responsive to identification (ID) data identifying the customer may be provided at the drive-through purchase obtaining facility to support automatic assignment of a pick-up station to the customer. For example, the ID data may provide information on the purchase ordered by the customer.

Also, the drive-through purchase obtaining facility may comprise a service facility for handling purchases delivered from the storage facility. The control station may be responsive to the ID data of the customer to support providing the service facility with a request to deliver the ordered purchase to the pick-up station assigned to the customer.

In addition, the control station may control a passing device to allow the customer to enter the drive-through purchase obtaining facility only after the customer is identified.

The drive-through purchase obtaining facility may further comprise at least one check-out station for enabling the customer to check out the ordered purchase without leaving the vehicle. For example, the customer may be enabled to pay for the ordered purchase.

The pick-up station may be released from being assigned to the customer after the ordered purchase is checked out. The check-out station may control a passing device to allow the customer to exit the drive-through purchase obtaining facility after the ordered purchase is checked out.

Alternatively, the pick-up station may include a check-out arrangement for enabling the customer to automatically check out the ordered purchase.

In accordance with a method of the present invention, the following steps are carried out for selling goods:
  storing the goods available for sale in a storage facility,
  enabling a customer to order a purchase, and
  enabling the customer in a vehicle to obtain the purchase in a drive-through purchase obtaining facility remote with respect to the storage facility, without leaving the vehicle, after a time period sufficient to deliver the purchase from the storage facility to the drive-through purchase obtaining facility.

In accordance with an embodiment of the present invention, one of multiple pick-up stations within the drive-through purchase obtaining facility may be automatically assigned to the customer in response to ID data identifying the customer or the ordered purchase. A request to deliver the ordered purchase to the assigned pick-up station may be generated simultaneously with assigning the pick-up station.

The customer may be enabled to check out the ordered purchase without leaving the vehicle. The pick-up station may be released from being assigned to the customer after the ordered purchase is checked out.

In accordance with another aspect of the present invention, a drive-through retail facility is provided for enabling a customer in a vehicle to make a purchase without leaving the vehicle. The retail facility comprises multiple purchase pick-up stations, and an assignment arrangement for automatically assigning one of the multiple pick-up stations to the customer in response to information provided by the customer. For example, the pick-up stations may enable the customer to obtain the purchase ordered in advance from a remote location.

Still other aspects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and entities are shown in schematic form in order to avoid unnecessarily obscuring the present invention.

Figure 1:
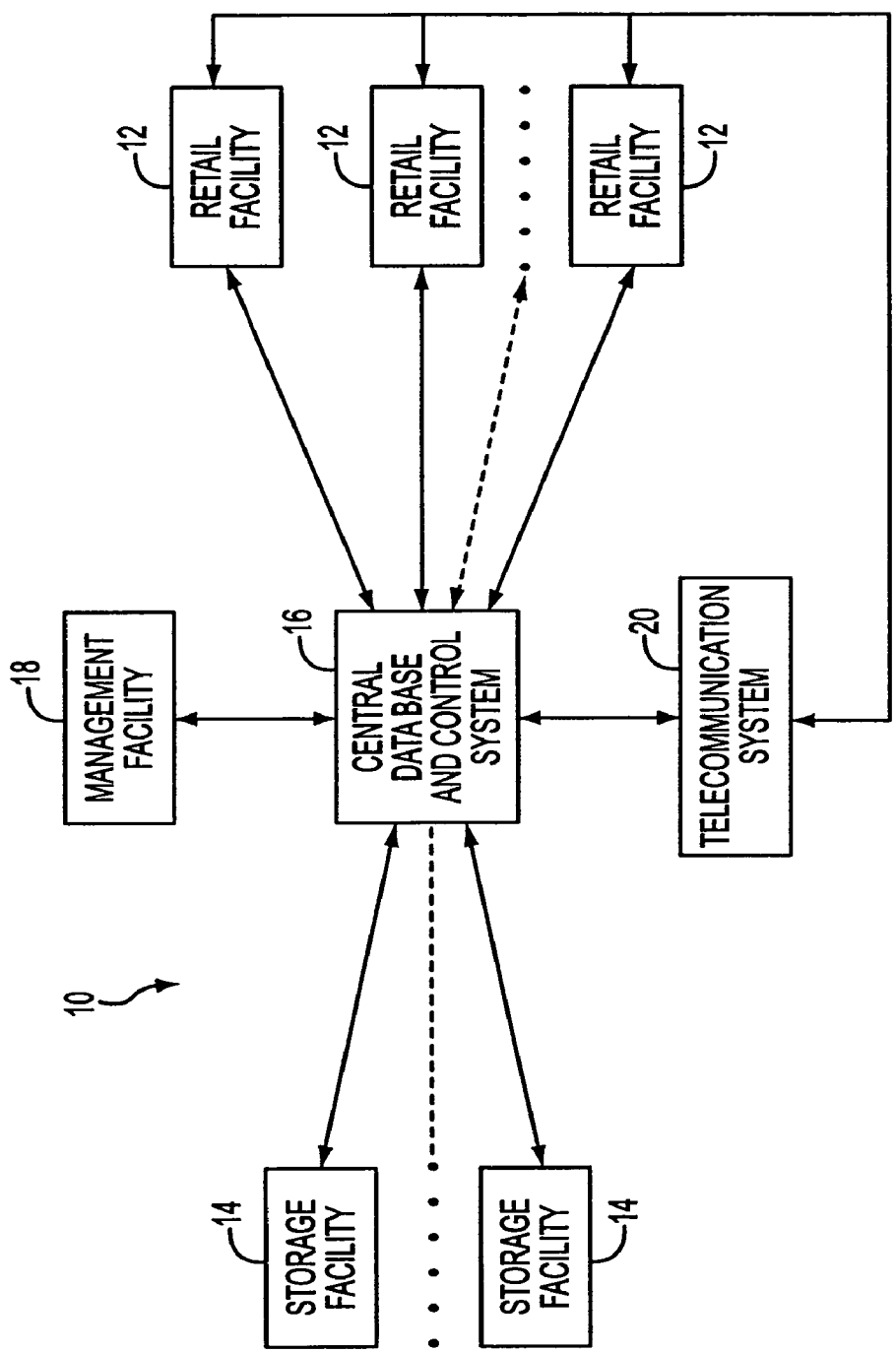
FIG. 1 illustrates a retail system of the present invention.

As schematically illustrated in FIG. 1, a retail system 10 of the present invention may comprise a plurality of retail facilities 12 for enabling customers to order and/or receive purchases, a plurality of storage facilities 14, a central data base and control system 16, a management facility 18, and a telecommunications system 20, such as an Internet-based communications network. For example, the retail system 10 of the present invention may sell such items as food products, consumer goods, video/audio products, etc. A delivery system may be provided to enable delivery of goods to the storage facilities 14, and from the storage facilities 14 to the retail facilities 12.

Each retail facility 12 may be a purchase ordering facility that enables a customer to place an order for a purchase, or a purchase check-out facility that provides the check-out of the purchase ordered by the customer. Alternatively, the purchase ordering facility may be combined with the check-out facility.

A location for placing an order for a purchase is independent from the location where the ordered purchase may be checked out and picked up. While a customer may place an order and receive the ordered purchase at the same retail facility 12, the customer is enabled to order a purchase at one retail facility 12, and receive the ordered purchase at another retail facility 12. For example, a customer may place a purchase order at the retail facility 12 located near the customer's place of business, and receive the ordered purchase at the retail facility 12 located near the customer's residence.

In accordance with the present invention, at least one retail facility 12 has a drive-through check-out arrangement disclosed in more detail later.

The storage facilities 14 are provided for storing goods to be sold via the retail facilities 12. Also, the storage facilities 14 may provide collecting items to prepare the ordered purchases to be delivered to the respective retail facility 12. For instance, one storage facility 14 may be provided in a particular area to supply the retail facilities 12 arranged in that area with the ordered purchases.

The central data base and control system 16 performs collection, storage and processing of data required to support operations of the retail system 10. Also, the central data base and control system 16 supports interactions between various elements of the retail system 10. For example, the central data base and control system 16 may provide the storage facilities 14 with purchase order information in response to purchase order requests from the retail facilities 12.

The management facility 18 performs management and administrative functions required to support operations of the retail system 10. For example, the management facility 18 may monitor retail system operations to detect and correct errors and malfunctions. Also, the management facility 18 may be responsible for maintaining adequate amount of goods at the storage facilities 14, collecting and analyzing sales information, marketing, and establishing prices.

The telecommunications system 20 enables customers to place purchase orders from locations remote with respect to the retail system facilities. In particular, the retail facilities 12 of the present invention may provide the check-out of purchases ordered via the Internet or a telephone system. The telecommunications system 20 may support the customer's access to the central data base and control system 16 to receive information on product availability and prices.

To facilitate the ordering process, the customer may be provided with a data storage device, such as a CD-ROM device, which contains information on items available in the retail system 10. The telecommunications system 20 may connect the customer's data storage device to the central data base and control system 16 to update the information stored by the data storage device.

The telecommunications system 20 transmits information on a purchase order placed by a customer to the central data base and control system 16 for arranging purchase delivery from the respective storage facility 14 to the retail facility 12 selected by the customer.

Alternatively, the telecommunications system 20 may support placing an order via a telephone system. In this case, a customer can place a telephone call to an operator to order a purchase composed of items selected based on the information provided by the operator or using a list of available items. The present invention enables the customer that made a telephone purchase order to receive the ordered purchase at any retail facility 12 selected by the customer.

Figure 2:
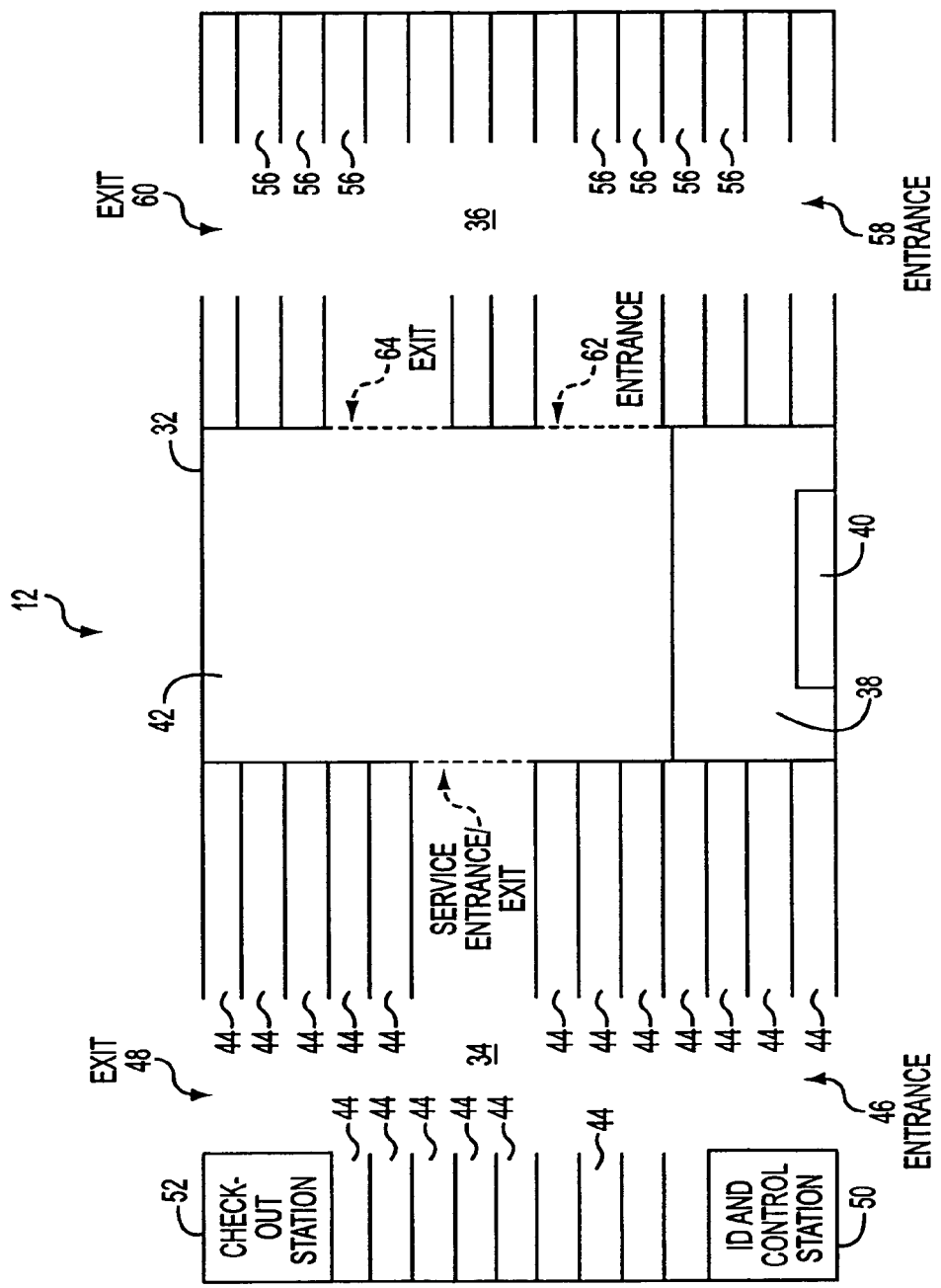
FIG. 2 illustrates an exemplary embodiment of a drive-through facility in the retail system of the present invention.

FIG. 2 illustrates an exemplary embodiment of a retail facility 12 having a drive-through arrangement. The retail facility 12 comprises a service facility 32, a check-out parking facility 34 that provides parking for vehicles of customers that intend to pick up a purchase ordered in advance, and an ordering parking facility 36 that provides parking for vehicles of customers that intend to place an order for a purchase. The ordering parking facility 36 may also be used by customers that wish to pick up a pre-ordered purchase and to order a new purchase. For example, the parking facilities 34 and 36 may be implemented as parking lots or parking garages having space for vehicles to be parked.

The service facility 32 may comprise a storage section 38 for storing products pre-ordered by customers and delivered from the corresponding storage facility 14. For example, the storage section may include a dry-product storage area for keeping dry products, and a freezing and refrigerating storage area provided with freezing and refrigerating chambers for storing frozen products and products that should be kept refrigerated. A delivery area 40 may be arranged in the service facility 32 for unloading pre-ordered purchases delivered to the service facility 32 from the corresponding storage facility 14.

The service facility 32 may also comprise a shopping section 42 for enabling customers to place orders for purchases, and pick up pre-ordered purchases. Also, the shopping section 42 may contain a store for selling various products, for example, consumer goods.

To enable customers to place orders for purchases, the shopping section 42 may contain multiple showcases, display racks, bins, shelves and the like for holding and displaying samples representative of products available for sale. Each sample may be provided with a label readable by a portable reading device carried by customers. The labels may give information on a particular product and have indicia unique to the product represented by the sample. For example, the indicia may be in the form of a bar code. The label may contain the name of the product, its price, and such information as product's weight, size, manufacturer, nutritional value, etc. In addition, the ordering section 38 may contain purchase ordering terminals that enable customers to order all goods available for sale in the retail system 10 including the products that are not represented by the samples available in the shopping section 42. The purchase ordering arrangement is disclosed in more detail in my copending U.S. patent application Ser. No. 09/745,420 filed on Dec. 26, 2000, entitled "Retail System with Purchase Ordering" and incorporated herewith by reference.

Also, the shopping section 42 may include a check-out arrangement enabling customers to pick up their purchases. For example, pick up stations may be provided for picking up and inspecting pre-ordered purchases. The check-out arrangement is disclosed in more detail in my copending U.S. patent application Ser. No. 09/788,674 filed on Feb. 21, 2001, entitled "Purchase Check-out Arrangement in Retail System" and incorporated herewith by reference.

The check-out parking facility 34 serves customers that arrive to pick up purchases ordered in advance. As discussed above, customers may order purchases before arriving to the retail facility 12 from a location remote with respect to the retail facility 12 via a telecommunication system, for example, an Internet-based system or a telephone system.

The check-out parking facility 34 contains multiple parking spaces 44 each sufficient to place a single vehicle. Each of the parking spaces 44 is identified by a unique ID information, such as a number. If the parking spaces 44 are arranged in rows and columns, the ID information of each parking space 44 may represent the position of the parking space 44 with respect to the rows and columns. For example, the ID number "14" may represent the parking space arranged in row 1, column 4. Each parking space 44 may be provided with a visual indicator or other indicia showing its ID information.

At least one entrance 46 and exit 48 are provided to enable vehicles of customers to enter and exit the parking facility 34. The entrance 46 may be combined with the exit 48.

An identification and control station 50 may be provided near each entrance 48 for providing identification of customers and enabling vehicles of customers to enter the parking facility 34. As discussed in more detail later, the identification and control station 50 may interact with the central data base and control system 16 or with a local control system provided at the retail facility 12 to assign a parking space to each customer's vehicle that enters the parking facility 34.

The identification and control station 50 is configured so as to allow customers to stay at their vehicles during the identification and parking space assignment procedures. For example, the identification and control station 50 may contain a detector that detects information of a customer's card issued to a permanent customer of the retail system 10, or a purchase receipt issued to a customer during a purchase ordering process.

Also, the identification and control station 50 may comprise a data input device that enables customers to enter ID information assigned to them during purchase ordering performed in advance via a telecommunication system. For example, after placing an order for a purchase via the telecommunication system, customers may receive an order number identifying their order. This order number may be entered to the identification and control station 50 to identify a customer.

Also, customer's identification provided by the identification and control station 50 enables the central data base and control system 16 or the local control system to issue a request for collecting a purchase pre-ordered by a customer simultaneously with assigning a parking space to that customer.

In addition, the identification and control station 50 may control a passing device, such as a barrier, arranged at the respective entrance 46 so as to allow a customer to enter the parking facility 34 only after the customer is identified by the identification and control station 50. The identification and control station 50 may be provided with a data communications circuit for providing data exchange with the central data base and control system 16 or the local control system.

At least one check out station 52 is provided near each exit 48 to enable customers to pay for their purchases without leaving their vehicles. The check out station 52 may control a passing device, such as a barrier, arranged at the respective exit 48 to allow a customer to exit the parking facility 34 only after the customer pays for its purchase.

The check-out parking facility 34 may be connected with the service facility 32 through a service entrance/exit 54. As explained in more detail later, the service entrance/exit 54 is arranged for delivery purchases from the service facility 32 to customers sitting in their vehicles at the parking facility 34.

The ordering parking facility 36 may be provided in addition to the check-out parking facility 34 to serve customers that arrive to place orders for purchases. Also, the parking facility 36 may be used by customers that wish to pick up a purchase ordered in advance and place an order for another purchase. In addition, the parking facility 36 may accommodate customers who intend to buy products offered for sale in a store that may be provided in the service facility 32.

The parking facility 36 having multiple parking spaces 56 may have an entrance 58 and an exit 60 for enabling customers' vehicles to enter and exit the parking facility 35. Also, an entrance 62 and an exit 64 may be provided for enabling customers to enter and exit the service facility 32.

In accordance with the present invention, a customer is enabled to place on order for a purchase before arriving at the retail facility 12. Such an order may be placed from a location remote with respect to the retail facility 12 using the telecommunication system 20 supporting, for example, Internet-based or telephone orders from customers. Alternatively, an order for a purchase may be placed from the retail facility 12, at which the customer intends to pick up the purchase, or from another retail facility 12.

The central data base and control system 16 processes a customer's order to deliver the ordered products from one of the storage facilities 14 to the retail facility at which the customer intends to pick up the ordered purchase. A time interval between placing an order for a purchase and picking up the ordered purchase should be sufficient to deliver the purchase from the corresponding storage facility 14 to the retail facility 12.

When a customer arrives at the retail facility 12 to pick up a pre-ordered purchase, the customer's vehicle enters the ordering parking facility 34 via the entrance 46 and stop near the identification and control station 50 so as to allow the station 50 to detect ID information identifying the customer. For example, the identification and control station 50 may read the ID information from the customer's card. Also, the identification and control station 50 may identify the customer by reading a purchase receipt issued during the purchase ordering process. Further, a customer may use the data input device at the identification and control station 50 to enter an ID information, such as an order number, assigned to the customer during the purchase ordering process performed, for example, using the Internet or a telephone.

When a customer is identified, the identification and control station 50 transfers customer's ID information to the central data base and control system 16 that assigns a parking space 44 to that customer. ID information of the assigned parking space 44 may be displayed on the identification and control station 50, and/or a purchase pick-up ticket indicating the parking space's ID information may be issued to the customer. The ID information of the assigned parking space 44 may include an ID number and/or other information enabling the customer to locate the assigned parking space 44. When the parking space is assigned to a customer, the identification and control station 50 may activate a passing device such as a barrier to allow the customer's vehicle to enter the parking facility 34 and proceed to the assigned parking space 44.

Simultaneously with assigning a parking space 44 to a customer, the central data base and control system 16 issues a purchase collection request providing a sales assistant in the service facility 32 with purchase information relevant to a purchase order of that customer. For example, the purchase information for a customer may include a purchase order ID number, purchase address information identifying location of the purchase in the storage section of the service facility 32, and the ID information of the parking space 44 assigned to the customer.

The sales assistant may interact with the central data base and control system 16 in an interactive mode. For example, in response to a message from the central data base and control system 16 indicating a purchase order ID number for a customer's purchase, the sales assistant may use a handheld data processing device, such as a personal digital assistant (PDA), wirelessly connected to the central data base and control system 16 to establish the address information relating to that purchase, and the ID information of the parking space 44 to which the purchase should be delivered.

A purchase for a customer may consist of items stored in different storage areas of the service facility 32. For example, some items may be stored in a dry-product storage area, and other items may be stored in a freezing and refrigerating storage area. The purchase address information provided by the central data base and control system 16 includes address information sufficient to locate each item of the purchase in different storage areas.

One skilled in the art would understand that a purchase for a customer may be collected in various ways. For example, one or multiple purchase baskets may be assigned to each purchase order. Each purchase basket may be provided with indicia to identify the basket in a unique way.

A sales assistant may collect the purchase baskets relating to an ordered purchase from different storage areas using a storage cart, and deliver them to the assigned parking space 44. The storage cart may have multiple sections for holding purchase baskets. Each of the sections may be identified by a unique address.

The central data base and control system 16 may control the purchase collection process. Each purchase basket may be identified with a storage address stored in the central data base and control system 16 to identify the location of the purchase basket inside and outside the retail facility 12. For example, the location of the purchase basket may be identified using addresses of the storage cart's sections, or ID numbers of the parking spaces 44.

When a purchase basket is placed on a storage cart for delivery to the assigned parking space 44, the storage address of the purchase basket is changed to update its location. The purchase address information provided by the central data base and control system 16 may include a data stream indicating changes in storage addresses of purchase baskets being moved outside and within the retail facility 12. The central data base and control system 16 may control the purchase collection process so as to transport purchase baskets collected for different purchase orders on the same storage cart.

To check whether a purchase composed of one or multiple purchase baskets collected from the various storage areas of the service and supply area 50 is correct, the total weight of the purchase baskets relating to a single purchase order may be compared with a reference weight stored in the central data base and control system 16. For example, the purchase baskets may be weighted when they are installed on the storage cart. The reference weight may be determined when the purchase order is formed in the storage facility 14 before delivery to the retail facility 12.

Alternatively, a collected purchase may be checked by a sales assistant by reading indicia on the purchase baskets representing the purchase. The indicia may be read using a portable scanning device wirelessly coupled to the central data base and control system 16. When the indicia on the first purchase basket is read, the central data base and control system 16 determines which purchase order corresponds to the purchase being checked. After reading indicia on all purchase baskets, the central data base and control system 16 sends to the sales assistant a signal confirming that the purchase is collected correctly. The confirmation signal may be displayed on a display device of the storage cart. If a purchase basket which does not belong to a collected purchase is found on the storage cart, the central data base and control system 16 provides the sales assistant with address information of that basket to enable the sales assistant to place the basket at a correct location in the retail facility 12.

After the central data base and control system 16 confirms that the purchase collected for a customer is correct, the purchase is delivered to the parking space 44 assigned to that customer, and is loaded to the customer's vehicle. A customer is enabled to inspect the purchase. For example, a purchase inspection table may be available. Each parking space may be equipped with a terminal having a button for requesting assistance. If a customer is not satisfied with a purchase, he or she may press this button to request assistance of a sales person. Using a handheld data processing device, the sales person may identify the purchase and remove from it items rejected by the customer. The central data base and control system 16 transfers information on the rejected items into a rejected items data base.

The rejected items are automatically removed from the purchase order of a customer to produce a modified purchase order for that customer.

After a customer receives the purchase, the customer's vehicle proceeds to the check out station 52 that enables the customer to pay for the purchase. The check out station 52 may print a purchase receipt identifying the purchase. For example, the check out station may be provided with a credit card reader to allow the customer to pay by a credit card.

In response to a payment performed by a customer, the check out station 52 may release the parking space 44 from being assigned to that customer. Simultaneously, the check out station 52 may open a passing device such as a barrier to allow the customer to exit the parking facility 34 via the exit 48.

Alternatively, credit card readers may be installed at the parking spaces 44 to allow customers to pay directly at the parking spaces 44. In this case, customers may exit the parking facility 34 using their customer's cards, or purchase receipts printed at the parking spaces 44.

Thus, the present invention provides a retail mechanism that involves ordering products, and picking them up after a time interval sufficient to deliver the purchase from a storage facility to a retail facility. As a result, products can be sold at multiple locations without having to stock warehouses full of products at those locations.

Moreover, the drive-through arrangement of the present invention enables customers to buy a wide range of products without leaving their cars in a manner that virtually eliminates lines even during rush hours.

Those skilled in the art will recognize that the present invention admits of a number of modifications, within the spirit and scope of the inventive concepts. For instance, the retail facility 12 and its elements, such as the identification and control station 50, and the check-out station 52, may be implemented in a number of different ways. For example, the identification and control station 50 may be implemented using specifically engineered chips having logic circuits and other components for performing the functions described above. Alternatively, the identification and control station 50 may be implemented using general purpose digital signal processors and appropriate programming.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A retail system for providing pickup of an order in a vehicle comprising:
    at least one storage facility for storing goods available to order,
    a plurality of purchase obtaining facilities remote with respect to the storage facility,
    said plurality of purchase obtaining facilities further providing pickup stations where a person in a vehicle can pickup said order,
    said purchase obtaining facilities containing a service area for temporarily storing said order delivered from the storage facility,
    an order unit capable of inputting said order in advance of arrival at one of said plurality of purchase obtaining facilities,
    said plurality of purchase obtaining facilities including a control unit configured to:
    input identification data when the customer in said vehicle arrives at the purchase obtaining facility,
    correlating the identification data with information identifying the order,
    automatically assigning the customer one of a plurality of pickup stations,
    when the customer is assigned one of a plurality of pickup stations automatically requesting delivery of the order from the service area to the customer in said vehicle at the assigned pickup station.

2. The retail system of claim 1, wherein the identification data identifies the customer.

3. The retail system of claim 1, wherein the purchase obtaining facility further comprises at least one check-out station for enabling the customer to check out the order without leaving the vehicle.

4. The retail system of claim 1, wherein the pickup station is released from being assigned to the customer after the order is obtained.

5. The retail system of claim 3, wherein the checkout station enables the customer to exit the purchase obtaining facility only after the order is checked out.

6. The retail system of claim 1, wherein the plurality of plurality of pickup station include a checkout arrangement for enabling the customer to automatically check out the order.

7. A method for providing pick-up of an order in a vehicle, comprising the steps of:
    storing available to order goods in at least one storage facility,
    providing a plurality of purchase obtaining facilities remote with respect to the storage facility plurality of purchase obtaining facilities further providing pickup stations where a person in a vehicle can pickup said order, and
    the purchase obtaining facilities contain a service area for temporarily storing said order delivered from the storage facility,
    receiving the order placed in advance of arrival at one of said plurality of purchase obtaining facilities,
    configuring said plurality of purchase obtaining facilities to:

input the identification data when the customer in said vehicle arrives at the purchase obtaining facility, correlating the identification data with information identifying the order automatically assigning a customer one of a plurality of pickup stations, when the customer is assigned one of a plurality of pickup stations automatically requesting delivery of the order from the service area to the customer in said vehicle at the assigned pickup station.

8. The method of claim 7, further comprising the step of enabling the customer to check out the order without leaving the vehicle.

9. The method of claim 7, further comprising the step of releasing said one of a plurality of pickup stations from being assigned to the customer after the order is obtained.

10. The method of claim 7, further comprising the step of enabling the customer to automatically check out the order at said one of a plurality of pickup stations.

11. A drive-through retail facility for enabling a customer in a vehicle to make a purchase without leaving the vehicle, the retail facility comprising:

at least one storage facility for storing goods available to order, a plurality of purchase obtaining facilities remote with respect to the storage facility, said plurality of purchase obtaining facilities further providing pickup stations where a person in a vehicle can pickup said order, said purchase obtaining facilities containing a service area for temporarily storing said order delivered from the storage facility, an order unit capable of inputting said order in advance of arrival at one of said plurality of purchase obtaining facilities, said plurality of purchase obtaining facilities including a control unit configured to:

input identification data when the customer in said vehicle arrives at the purchase obtaining facility, correlating the identification data with information identifying the order, automatically assigning the customer one of a plurality of pickup stations, when the customer is assigned one of a plurality of pickup stations automatically requesting delivery of the order from the service area to the customer at the assigned pickup station without the customer having to leave the vehicle.

12. The facility of claim 11, wherein said control system is configured to release said one of a plurality of pickup stations from being assigned to the customer when the customer obtains the purchase.

\* \* \* \* \*